(12) United States Patent
Baron et al.

(10) Patent No.: US 10,602,557 B2
(45) Date of Patent: *Mar. 24, 2020

(54) DISCOVERING AND PROTECTING DATA STREAMS IN MULTI-PATH COMMUNICATION ENVIRONMENTS

(71) Applicant: Microsoft Technology Licensing, LLC, Redmond, WA (US)

(72) Inventors: Drew Baron, Redmond, WA (US);
Vishal Mhatre, Redmond, WA (US);
Gianluigi Nusca, Seattle, WA (US);
Christian Huitema, Friday Harbor, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/426,902

(22) Filed: Feb. 7, 2017

(65) Prior Publication Data

US 2018/0152976 A1     May 31, 2018

Related U.S. Application Data

(60) Provisional application No. 62/428,446, filed on Nov. 30, 2016.

(51) Int. Cl.
*H04L 29/06* (2006.01)
*H04W 76/14* (2018.01)
(Continued)

(52) U.S. Cl.
CPC ............ *H04W 76/14* (2018.02); *H04L 45/24* (2013.01); *H04W 4/80* (2018.02); *H04W 12/003* (2019.01);
(Continued)

(58) Field of Classification Search
USPC ......................................................... 713/151
See application file for complete search history.

(56) References Cited

U.S. PATENT DOCUMENTS

| | | | | |
|---|---|---|---|---|
| 7,715,308 B2 * | 5/2010 | Ramaswamy | ...... | G06F 11/2097 370/217 |
| 8,369,235 B2 * | 2/2013 | Kim | ...... | H04L 45/121 370/236 |

(Continued)

FOREIGN PATENT DOCUMENTS

| | | |
|---|---|---|
| CN | 105682182 | 6/2016 |
| WO | WO 2015151962 | 10/2015 |

OTHER PUBLICATIONS

"Non Final Office Action Issued in U.S. Appl. No. 15/426,928", dated Jul. 27, 2018, 9 pages.

(Continued)

*Primary Examiner* — Amare F Tabor
(74) *Attorney, Agent, or Firm* — Klarquist Sparkman, LLP

(57) ABSTRACT

Methods and apparatus are disclosed for device discovery, pairing, and transmission of audio and video media, using two or more communication paths between a media sender/source node and a media receiver/sink node. In one example of the disclosed technology, a method performed with a sink node adapted to receive data via a peer-to-peer communication and a different, second communication path, includes selecting at least a portion of a second communication path to the sink node, determining whether the second communication path is secure, and, if the second communication path is determined to be secure, then accepting connections via the second communication path.

20 Claims, 10 Drawing Sheets

(51) Int. Cl.
*H04W 48/16* (2009.01)
*H04W 12/02* (2009.01)
*H04W 76/23* (2018.01)
*H04W 4/80* (2018.01)
*H04W 40/00* (2009.01)
*H04W 12/00* (2009.01)
*H04L 12/707* (2013.01)
*H04W 24/02* (2009.01)
*H04W 84/12* (2009.01)
*H04W 88/08* (2009.01)
*H04W 8/00* (2009.01)

(52) U.S. Cl.
CPC ........... *H04W 12/02* (2013.01); *H04W 40/00* (2013.01); *H04W 48/16* (2013.01); *H04W 76/23* (2018.02); *H04W 8/005* (2013.01); *H04W 24/02* (2013.01); *H04W 84/12* (2013.01); *H04W 88/08* (2013.01)

(56) References Cited

U.S. PATENT DOCUMENTS

| | | | |
|---|---|---|---|
| 8,804,545 B2* | 8/2014 | Gesmundo | H04W 84/18 370/252 |
| 8,811,275 B2* | 8/2014 | Kim | H04N 21/43615 370/252 |
| 9,128,524 B2* | 9/2015 | Lee | G06F 3/038 |
| 9,197,680 B2 | 11/2015 | Kafle et al. | |
| 9,306,992 B2 | 4/2016 | Praveenkumar et al. | |
| 9,369,947 B2* | 6/2016 | Lee | H04W 48/16 |
| 9,641,963 B2* | 5/2017 | Park | H04W 4/80 |
| 10,136,311 B2* | 11/2018 | Bhargava | H04W 12/04 |
| 2006/0209884 A1 | 9/2006 | Macmullan et al. | |
| 2013/0304860 A1 | 11/2013 | Yang et al. | |
| 2014/0201415 A1 | 7/2014 | Huang et al. | |
| 2014/0334381 A1 | 11/2014 | Subramaniam et al. | |
| 2014/0351445 A1 | 11/2014 | Davidson et al. | |
| 2014/0351477 A1 | 11/2014 | Lee et al. | |
| 2014/0372620 A1 | 12/2014 | Vedula et al. | |
| 2015/0036735 A1 | 2/2015 | Smadi et al. | |
| 2015/0085847 A1 | 3/2015 | Yamaura | |
| 2015/0172757 A1 | 6/2015 | Kafle et al. | |
| 2015/0222474 A1 | 8/2015 | Hartley et al. | |
| 2015/0327313 A1 | 11/2015 | Kim et al. | |
| 2016/0088550 A1 | 3/2016 | Rabii et al. | |
| 2016/0134929 A1 | 5/2016 | Robii et al. | |
| 2016/0164933 A1 | 6/2016 | Kafle et al. | |
| 2016/0179295 A1 | 6/2016 | Liang et al. | |
| 2016/0183317 A1 | 6/2016 | Shao et al. | |
| 2016/0205148 A1* | 7/2016 | Lee | H04L 65/1069 709/219 |
| 2016/0286395 A1 | 9/2016 | Adrangi et al. | |
| 2016/0316361 A1* | 10/2016 | Bhargava | H04W 12/04 |
| 2017/0006117 A1 | 1/2017 | Kafle et al. | |
| 2017/0295088 A1 | 10/2017 | Van Der Kluit et al. | |
| 2018/0152977 A1 | 5/2018 | Baron et al. | |
| 2018/0176755 A1* | 6/2018 | Zhao | H04W 4/70 |

OTHER PUBLICATIONS

Mushtaq et al., "Extended Display Mode Using Android Miracast", In International Journal of Innovative Technology and Research, Apr. 17, 2015, pp. 84-86.

Tieu, et al., "Wi-Fi Direct Services", In Master's Thesis of Lund University, Jun. 2014, 73 pages.

Wi-Fi Alliance, "Wi-Fi Certified Miracast™: Extending the Wi-Fi experience to seamless video display", http://www.wi-fi.org/system/files/wp_Miracast_Industry_20120919.pdf, Document marked: Sep. 19, 2012, pp. 1-18.

"Notice of Allowance Issued in U.S. Appl. No. 15/426,928", dated Jun. 26, 2019, 9 Pages.

* cited by examiner

DISCOVERING AND PROTECTING DATA STREAMS IN MULTI-PATH COMMUNICATION ENVIRONMENTS

CROSS-REFERENCE TO RELATED APPLICATIONS

This application claims the benefit of U.S. Provisional Application No. 62/428,446, filed Nov. 30, 2016, which application is incorporated herein by reference in its entirety.

BACKGROUND

Some techniques for streaming display data, including video and audio streams in a peer-to-peer communication environment, include rendering and encoding video and audio at a sender node and transmitting the encoded data to a receiver node for display. Such data can be transmitted using a wireless communication link. However, managing and routing such data in a consumer environment offers ample opportunity for improvement in performance, security, and flexibility.

SUMMARY

Methods and apparatus are disclosed for transmitting data payloads, such as audio and/or video payloads from one or more source nodes to a sink node. The source and sink nodes can be implemented as computing devices that include video and audio encoders and/or decoders and that initiate, pair, and transmit data between nodes using one or more wireless or wired communication paths.

In some examples, device discovery is initiated and used to determine which of a plurality of two or more communication paths are to be used for transmitting data payloads from a source node to a sink node. Based on configuration preferences and attributes of the communication paths, an appropriate communication path can be selected for transmitting data payloads. Further, additional security measures can be applied based on properties of one or more of the communication paths.

In some examples of the disclosed technology, a method performed at a source node includes initiating device discovery between the source node and the sink node with a wireless peer-to-peer (P2P) protocol, sending an identifier of the source node to the sink node using the peer-to-peer protocol, determining a second communication path, such as a wireless infrastructure path, between the source node and the sink node using the identifier, where the second communication path does not include the wireless peer-to-peer communication path used to initiate device discovery, and determining whether the second communication path is secure, or can be secured using, for example, encryption.

In some examples of the disclosed technology, a communication path is selected based on configuration data stored at the sink node, and the determination of the security level or whether a path is or can be secured. Based on the determination, one of the communication paths can be selected for sending a data payload to the sink node, including audio or video data. In some examples, the screen display data generated by the source node is transmitted to the sink node as part of the data payload.

In some examples of the disclosed technology, additional security measures, such as disabling broadcasts or beacon functions provided by the sink node, are taken based on security determinations regarding communication paths between the source and the sink node. In some examples, information elements encoded in infrastructure network or peer-to-peer communication network traffic can include communication of one or more preferences used to establish and configure the connection between the source node and the sink node. In some examples, one or more of the communication paths can include a wired or optical connection. In other examples, the communication paths are mostly or entirely established using wireless communication technologies, such as Wi-Fi radio frequency (RF) communication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, any trademarks used herein remain the property of their respective owners. The foregoing and other objects, features, and advantages of the disclosed embodiments will become more apparent from the following detailed description, which proceeds with reference to the accompanying figures.

DETAILED DESCRIPTION

I. General Considerations

Figure 1:
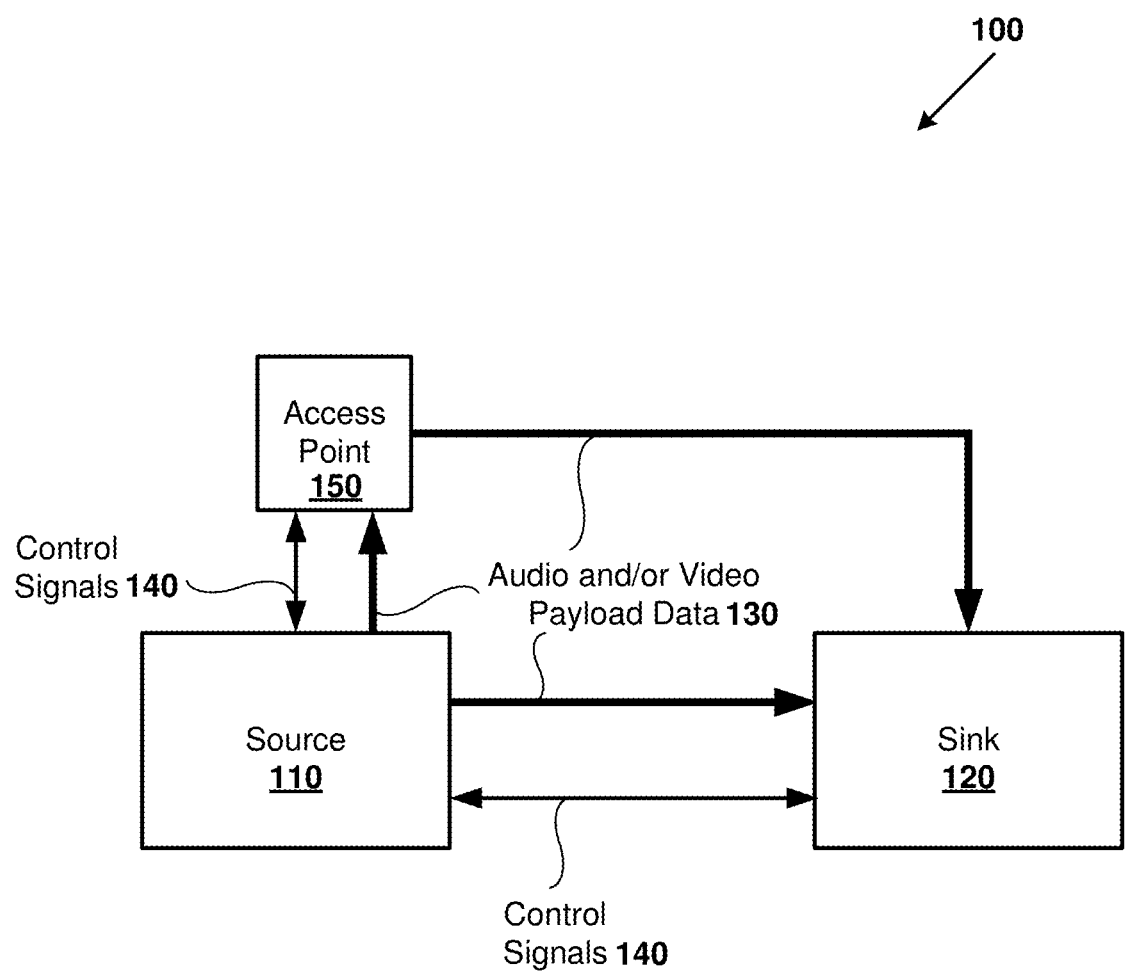
FIG. 1 is a block diagram outlining an example environment including a source node and a sink node, as can be used in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "determine," and "select" to describe the disclosed methods. These terms are high-level descriptions of the actual operations that are performed. The actual operations that correspond to these terms will vary depending on the particular implementation and are readily discernible by one of ordinary skill in the art.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., a thread executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

FIG. 1 is a block diagram 100 outlining an example environment in which disclosed apparatus and methods can be implemented. A source node 110 can connect to a sink node 120 using two or more communication protocols and/or transport mechanisms. The source node 110 is configured to transmit audio and/or video payload data to the sink node 120. The payload data 130 can be encoded using any suitable audio and/or video coder-decoder (codec) standard, including MPEG-2, H.264, VC-1, or other suitable codec standard. The payload data 130 can be transmitted directly to the sink node 120 via a wireless peer-to-peer communication protocol. The use of such direct, peer-to-peer wireless connections can be implemented without the assistance of an intermediate router. Many suitable peer-to-peer wireless connection protocols include a discovery protocol that enables devices in nearby proximity to each other to discover each other in order to establish pairing connections. For example, a peer-to-peer wireless connection implemented according to a Bluetooth standard, a Wi-Fi direct (WFD) standard, or a tunneled direct link setup (TDLS) (IEEE 802.11z) standard, can be used to send the payload data 130 via the peer-to-peer wireless connection. By providing the ability to communicate directly between two devices without the use of a third device (e.g., a router or access point), each source node (e.g., source node 110) and sink node 120 is effectively turned into an access point that can allow other WFD-enabled devices to connect with it. The bandwidth provided by the selected peer-to-peer wireless connection standard used should provide sufficient bandwidth to support the amount of data sent as the payload data 130. In some examples, the Miracast standard is used to capture and encoded video that is sent according to a WFD communication protocol.

Further, control signals 140 can be sent to and from the source node 110 and the sink node 120. For example, the sink node 120 can be configured to transmit periodic beacon signals (e.g., wireless beacon signals sent via WFD or multicast domain name service (mDNS) protocol) that advertise the existence of the sink node, and may also include information notifying potential source nodes regarding services provided by the sink node 120. Further, the control signals 140 can be used by the source node 110 to probe for desired services provided by one or more sink nodes 120.

The environment depicted in the block diagram 100 further includes an access point 150. The access point can be implemented as, for example, a Wi-Fi access point implemented in an enterprise infrastructure environment, a wired access point, such as an Ethernet connection, an optical connection, or any other suitable communication technology. The source node 110 can be coupled to the access point 150 in order to send payload data 130 to the access point 150, which, in turn, is transmitted from the access point to the sink node 120. Control signals 140 can also be transmitted to and from the access point 150 and the source node 110, as well as between the access point and the sink node 120. In some examples, the payload data and control signals sent between the access point 150 and the source node are transmitted via a wireless connection, for example an infrastructure mode Wi-Fi connection. The access point 150, in turn, is configured to send data via a wired connection, such as an Ethernet or optical connection to the sink. The infrastructure connection between the access point and the sink node may traverse a number of different nodes within an infrastructure network, including a number of routers, switches, and/or gateways.

The following terms will be used herein with regard to communications between source nodes and sink nodes. A source node is "paired" to a source node if the nodes have successfully completed capability negotiation, which includes performing a sequence of message exchanges between the source and sink nodes to determine a set of parameters used to define the audio/video payload during streaming communication session.

A wireless peer-to-peer connection includes nodes discovery and pairing, without requiring an AP.

A Wi-Fi multimedia source node is a device that supports streaming multimedia content multimedia sink node over a Wi-Fi link. A Wi-Fi multimedia sink node is a device that receives multimedia content from a Wi-Fi multimedia source node over a Wi-Fi link and renders the multimedia content (e.g., by displaying video or playing back audio).

Source and sink nodes discover each other's presence, prior to establishing a pairing connection. In some examples, device discovery further includes service discovery, which allows source and sink nodes to discover each other's service capabilities prior to establishing a pairing connection. The actual operations that correspond to the foregoing terms will vary depending on the particular implementation and are readily discernible by one of ordinary skill in the art.

As we will further explain below, technologies disclosed herein can be used to negotiate which communication paths to send the payload data between the source and sink nodes, as well as providing additional techniques for securing the data and for facilitating easier discovery and connection establishment between such source and sink nodes.

III. Example Mixed P2P Wireless/Infrastructure Wireless Environment

Figure 2:
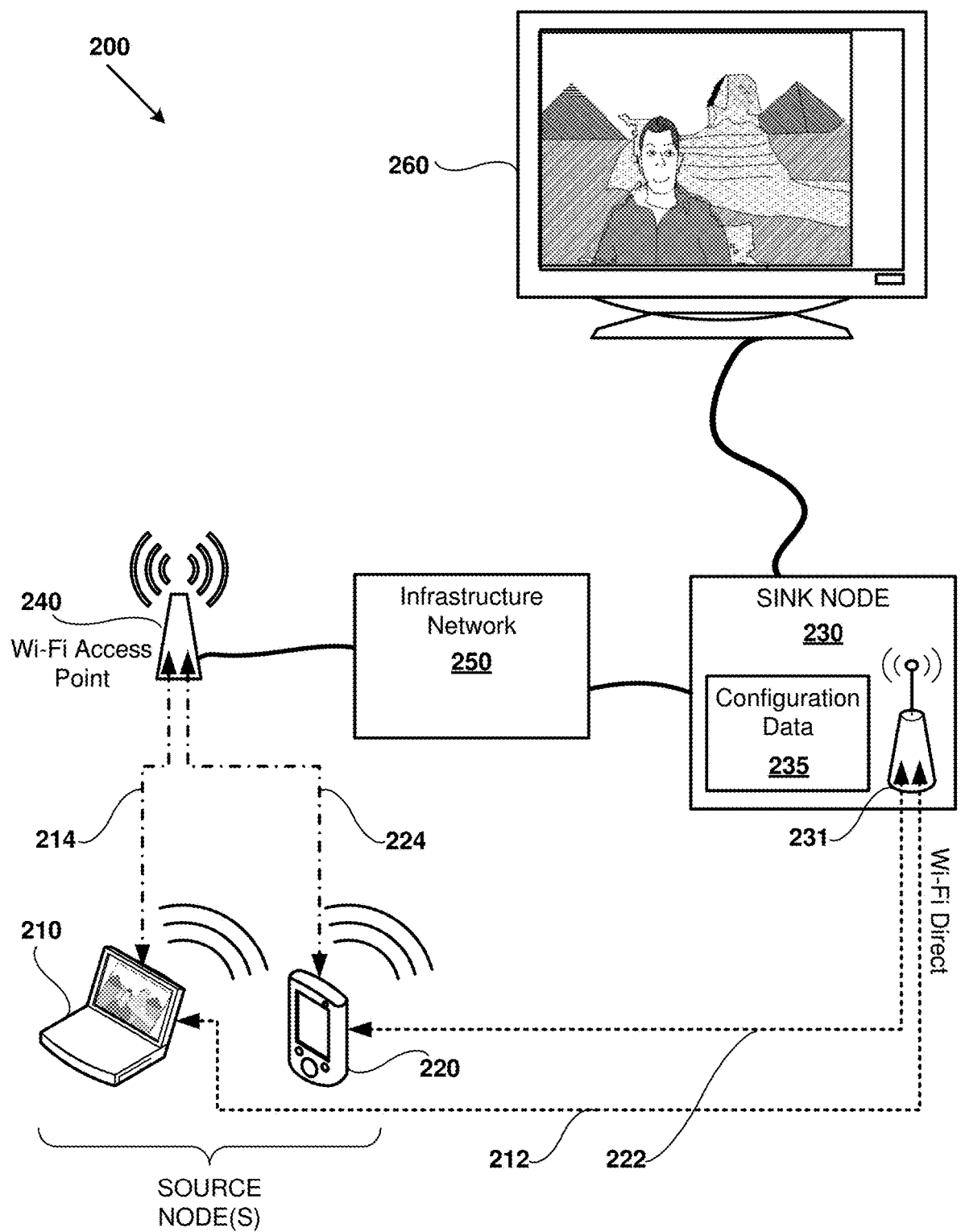
FIG. 2 is a diagram outlining an example of displaying video transmitted from a source node to a sink node, as can be used in certain examples of the disclosed technology.

FIG. 2 is a block diagram 200 further detailing an environment in which certain disclosed technologies can be implemented. A number of source nodes, including a wireless-enabled laptop 210 and a wireless-enabled mobile device 220 can be configured to negotiate connections for sending data including audio and video data to a sink node 230 receiver. Each of the source nodes 210 and 220 are adapted to send data to the sink node 230 via a peer-to-peer communication protocol path 212 and 222, respectively. The sink node 230 has a WiFi network interface 231 adapted to support peer-to-peer wireless communication.

In the illustrated example, the peer-to-peer communication protocol used is WFD, although other suitable protocols can be used to implement the direct peer-to-peer communication path. Each of the source nodes 210 and 220 are also configured to access a wireless access point 240 using infrastructure mode wireless protocols. The Wi-Fi access point 240 is, in turn, coupled to an infrastructure network 250, which network is coupled to the sink node 230. Thus, each of the source nodes 210 and 220 has a second communication path 214 or 224, respectively, that can send data to the sink node 230. For example, the second communication path 214 extends from the source node 210 to the Wi-Fi access point 240, through the infrastructure network 250 and then to the sink node 230.

The infrastructure network 250 can be implemented as a local area network (LAN), a wide area network (WAN), a virtual private network (VPN), or other suitable computing network.

In some examples, one or more of the source nodes 210 and 220 and the sink node 230 are configured to transmit audio/video data and control signals according to the Miracast protocol. The Miracast protocol allows for capturing screen display of the source node device, encoding the display into a video stream, and transmitting the data to a sink node. The sink node 230, in turn, decodes the video and/or audio stream and transmits the data for rendering on a video display 260. Audio can also be played back using speakers coupled to the display 260 or can be sent to a second sink node for reproducing the audio content.

In some examples, device discovery is initiated between one of the source nodes 210 or 220, and the sink node 230 via a wireless peer-to-peer protocol communication path. In some examples, the sink node 230 transmits a periodic beacon that advertises the information about the availability of the sink node, as well as services that may be provided by the sink node. In other modes of operation, a source node transmits a wireless discovery message that can be received by the sink node 230. Responsive to receiving the discovery message, the sink node transmits a reply via the peer-to-peer communication path that includes identifying information for the sink node, and may also include information about services that can be provided by the sink node 230. In some examples, the discovery information may also include information regarding capabilities of, for example the display 260, including screen resolution, frame rate, encryption standards, security levels, security protocols, manufacturer and/or model of the sink node and/or display, or information regarding the location of the sink node or its attached display. In some examples, certain properties of the sink node can be encoded in one or more extended fields of a multicast domain name server (mDNS) encoded message based on the configuration data 235 stored at the sink node 230. For example, the configuration data can include preferences and/or aspects of the display as well as communication of preferences for processing video streams that are received by the sink node. In some examples, the data is encoded in an information element of a WFD connection packet. In some examples, the data is encoded in an mDNS connection packet via the infrastructure network 250.

As part of the discovery process, a source node can send an identifier to the sink node that can be used in establishing a connection between the source node and the sink node. For example, the identifier can be a name associated with the source node, a key associated with the source node, an object identifier (OID), a MAC address, or other suitable identifier. The sink node 230, in turn, can use the received identifier to attempt to establish other communication paths to the source node engaged in the discovery process. For example, the identifier can allow the sink node to identify additional connections from the source node to the Wi-Fi access point 240 via the infrastructure network connection 250. Upon determining a second communication path between the source node and the sink node using the source node as an identifier, the sink node 230 determines whether the second communication path is secured or can be secured. For example, if the Wi-Fi access point 240 does not use encryption, or uses an inferior security protocol such as Wired Equivalent Privacy (WEP) instead of Wi-Fi Protected Access (WPA) or Wi-Fi Protected Access II (WPA2) (according to the IEEE 802.11i standard); or uses WPA instead of WPA2, the sink node can determine that the second communication path is not secure.

In some examples, the sink node can determine that the second communication path is not secure if the second communication path is not using an encrypted connection, such as VPN (a virtual private network connection), HDCP (High Bandwidth Digital Copy Protection), or IPSec. In some examples, the sink node can determine which encryption standard and/or security protocols are being used by a wireless access point with an API provided by an operating system executing on the sink node. In some examples, the sink node can determine which encryption standard and/or security protocols are being used by a wired connection with an API to determine if IPSec, VPN, HDCP, 801.1AE, or other suitable standard or technology is in place.

It should be readily understood to one of ordinary skill in the relevant art that other criteria can be used to assess the security of the second communication path. For example, the availability of encryption, physical access to the network, accessibility from external networks including the Internet, or other criteria can be used. In some examples, the sink node can assess the security of the second or other communication paths prior to any discovery be initiated for a source node. The sink node can identify that an unsecured WiFi access point is not secure, and then respond based on this assessment after discovery with a source node is initiated, or to change the beacon transmitting behavior of the source node. In some examples, the source nodes are connected to the Wi-Fi access point 240 via a wireless infrastructure connection. In some examples, the Wi-Fi direct connection uses the same network channel (e.g., both using WiFi channel 6) used to connect to the Wi-Fi access point. In other examples, different RF channels are used to establish the respective connections (e.g., one connection on channel 1 and another connection on channel 6).

Based on determining whether the second communication path is secured or can be secured, a number of actions can be taken. For example, if the second communication path is determined not to be secure, then a communication pairing between the source node 210 or 220 and the sink node 230 is established via the wireless peer-to-peer protocol communication path, instead of via the infrastructure network 250. In some examples, if the second communication path is determined not to be secure, then a communication pairing via the second communication path is refused. In some examples, if the second communication path can be secured, then a communication is established pairing the source node and the sink node via encrypted communication over the second communication path. For example, if the sink node 230 determines that the default level of security provided by the Wi-Fi access point 240 is insufficient, the sink node 230 can initiate and require implementation of an application level encryption protocol, such as Transport Layer Security (TLS), VPN, or High-bandwidth Digital Content Protection (HDCP). In some examples, based on the determining, advertising of the sink node 230 or advertising of sink node services can be modified or eliminated. For example, if the infrastructure network 250 or Wi-Fi access point 240 are determined not to be secure, then beacon discovery can be disabled. As another example, broadcasting of services via mDNS can be disabled if the second communication path is determined not to be sufficiently secure.

If a sufficient level of security is available, or the sink node 230 otherwise determines that connection can be established, then a communication pairing is established between the source node 210 or 220 and the sink node 230, and subsequent data such as video and/or audio data can be streamed from the source node to the sink node 230.

IV. Example Session Management Modules

Figure 3:
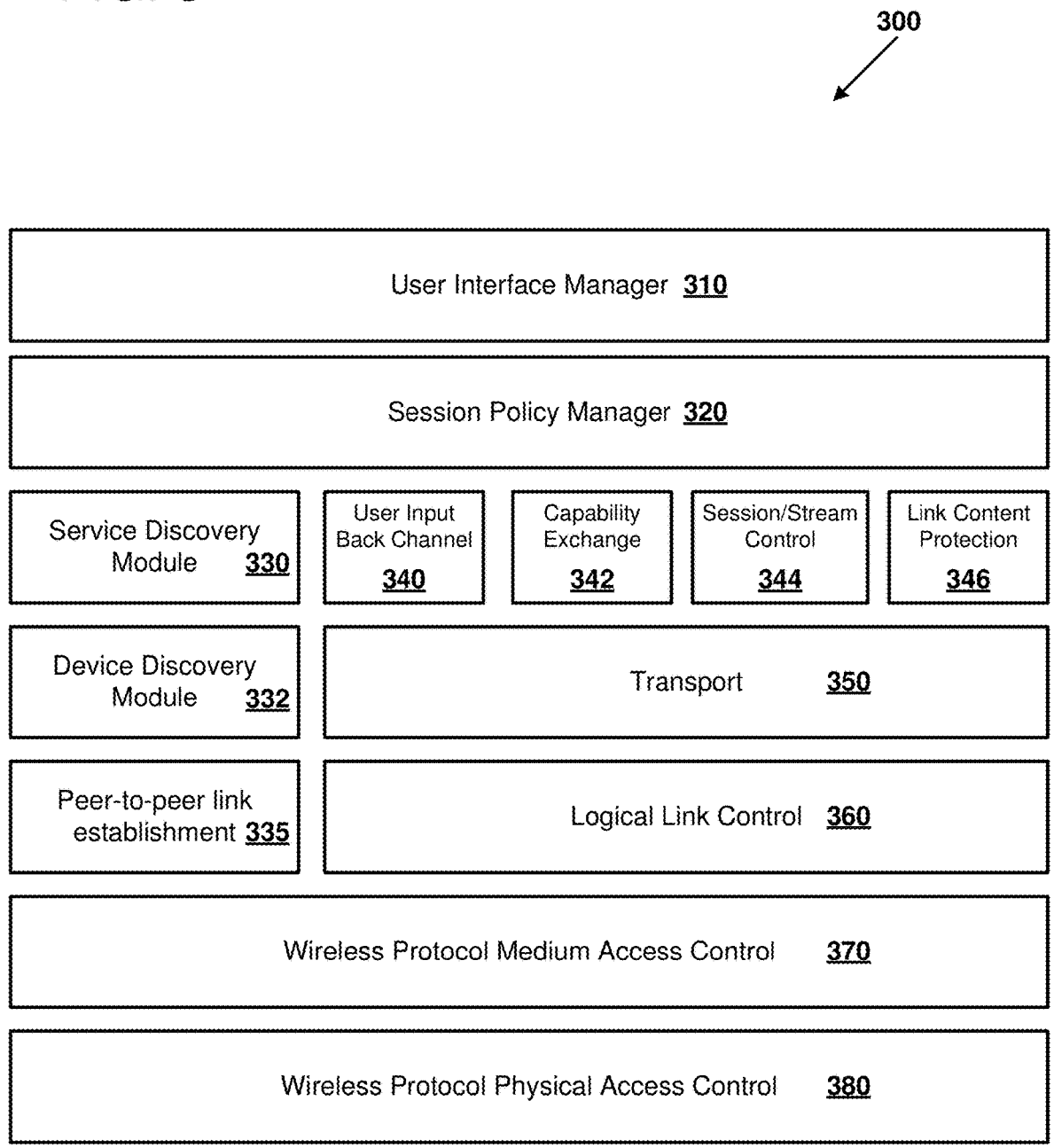
FIG. 3 is a diagram outlining example modules that can be used to implement source/sink node communication, as can be used in certain examples of the disclosed technology.

FIG. 3 depicts a model 300 used for session management of communication between paired source and sink node devices, as can be used in certain examples of the disclosed technology. For example, the illustrated model can be applied to direct wireless peer-to-peer communication, as well as infrastructure communications using wireless and/or wired protocols. As shown, a module (e.g., a module implemented with a general or application-specific processor executing computer-readable instructions) implements a user interface manager 310. The user interface manager 310 is configured to collect user input from devices such as keyboards, mice, touch screens, motion detection, or other suitable input devices that can be used to collect user input that is used to direct operation of a corresponding source or sink node. For example, the user interface manager can provide a GUI, including GUIs implemented with touch screen displays that allow users to initiate discovery, confirm pairings to selected sink nodes, and select media or screen data for streaming to a sink node.

A session policy manager 320 can be implemented with software modules and are used to control when and how payload data is generated and sent to a sink node. For example, the session policy manager 320 can include mechanisms for authorization and authentication of users and their associated devices. For example, certain users or groups may be restricted as to which sink node devices, or which communication paths, are allowed to be utilized.

The illustrated model further includes a service discovery model 330, a device discovery module 332, and a peer-to-peer link establishment module 335. The service discovery module is used to process operations associated with discovery of services provided by one or more prospective sink nodes. The device discovery module 332 is used to discover and establish connections with one or more available sink nodes. The peer-to-peer link establishment module 335 is used to establish direct peer-to-peer communication, including wireless communication between a source node and a sink node, without the use of an infrastructure wireless or wired connection. The model further includes modules for providing a user input back channel 340, a capability exchange module 342, a session stream control module 344, and a link content protection module 346. The user input back channel module 340 is used to process input from user devices including keyboards, mice, touchscreens, motion sensing devices, and other suitable input devices. The capability exchange module is used to send and receive data between a source node and a sink node in order to identify capabilities of the respective source/sink nodes. For example, the capability exchange 342 can process data relating to manufacturer, model, screen resolution, color depth, three-dimensional display, supported video codecs, or other suitable capabilities. The session stream control module 344 is used to initiate and establish streaming of video and audio data, for example, using suitable video and audio codecs such as H.264, H.265, VC-1, MPEG-2, MP3, WMV, or AAC. For example, the sessions/stream control module 344 can be used to synchronize playback of the video stream between a source and a sink node. The link content protection module 346 can be used to provide additional security to payload data sent from a source to a sink node. For example, a VPN session, an HDCP session, or other suitable encryption can be used at the application level to prevent tampering or other unauthorized access to payload data sent between the source and sink nodes.

The model further includes a transport module 350 which controls packetizing an encoding of data between source and sink nodes according to a communication protocol, for example, TCP or UDP network protocols. A logical link control module 360 is also provided for managing logical links between various source nodes and sink nodes.

The model further includes a wireless protocol medium access control module 370 which operates at the network data link layer. For example, the medium access control module 370 can be used to control frame delimiting and recognition, network addresses for the source and sink nodes, provide error correction and checking, and control access to the lower physical access layer. Examples of suitable protocols that can be controlled by the medium access control module 370 include Ethernet (IEEE 802.3), CSMA/CA (e.g., as used in 802.11 Wi-Fi wireless networks), CDMA, GSM, LTE, or other suitable network access protocols. The medium access control module 370 can also be used to establish direct peer-to-peer connections between source nodes and sink nodes.

The wireless protocol physical access control module 380 controls physical access to the transmission media, such as a wireless RF or optical communication media, a wired media, such as a CAT5 twisted pair cable, or an optical network.

Thus, implementations of the source and/or sink nodes such as those discussed above regarding FIGS. 1 and 2 can implement all or a portion of the modules described with respect to the reference model 300 in order to initiate discovery and establish communication pairings between source nodes and sink nodes.

V. Example Audio/Video Payload Processing

Figure 4:
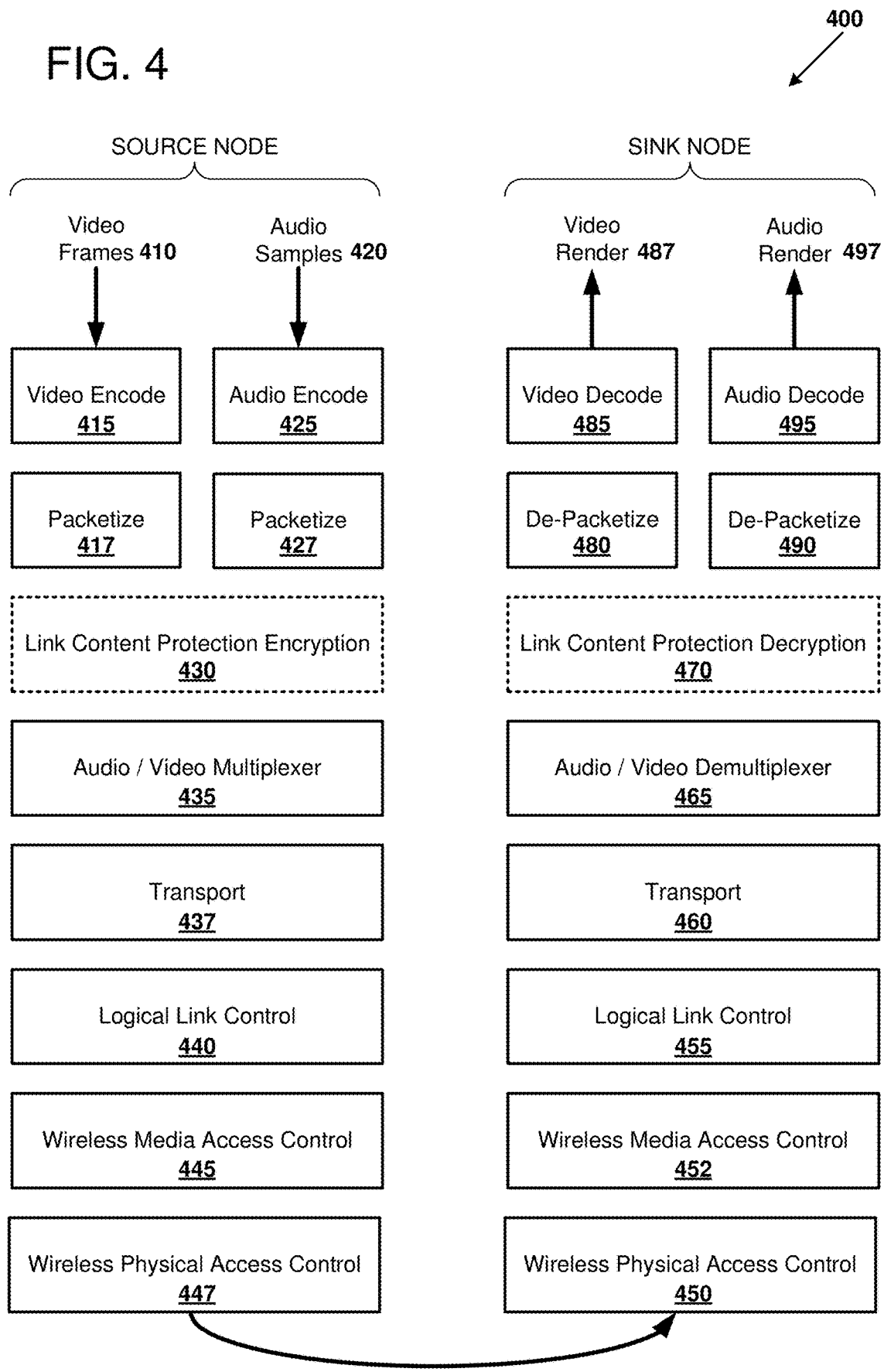
FIG. 4 outlines an example of video encoding and decoding between a source node and a sink node, as can be used in certain examples of the disclosed technology.

FIG. 4 is a diagram 400 representing a model of video and audio payload processing for data sent from a source node to a sink node, as can be performed in certain examples of the disclosed technology. For example, the hardware source node and sink nodes described above regarding FIGS. 1 and 2 can be used to implement the disclosed audio/video payload processing.

As shown, a number of video frames 410 are ingested by a video encoder 415 implemented at the source node. The video encoder can accept video data for display on the source code device, including video streams downloaded or streamed from a network, video data encoded in a DVD or Blu-Ray disk, or by capturing video data directly from one or more screens being displayed on one or more screens coupled to the source node. For example, video data stored in video RAM or other memory of the source node can be ingested by the video encoder 415. The video encoder 415 can encode the video using any suitable protocol, including H.264, H.265, VC-1, MPEG-2, or other suitable protocol. The encoded video is then broken into network packets by a packetizing module 417. Similarly, audio samples collected from network sources, computer readable media such as flash memory or disks, or audio generated by operation of a storage node can be sampled 420 and provided to an audio encoder 425. Examples of suitable encoders that can be used to encode the audio samples 420 include MP3, Windows Media Audio (WMA), Advanced Audio Coding (AAC), or other suitable encoding formats. The audio is packetized 427 typically into separate network packets. The packetized video and audio can then be provided to a link content protection encryption module 430, which applies encryption to the packetized data. For example, HDCP can be used to provide encryption across the source/sink node link. The encrypted packets are provided to an audio/video multiplexer 435 which selects video and audio and serializes for providing to the transport module 437. The transport module 437, in turn, provides the serialized packets, which have been encoded into suitable network packets such as RTP (Real-time Transport Protocol), TCP (Transmission Control Protocol), or UDP (User Datagram Protocol) network packets to provide to the logical link control module 440. The logical link control module 440, in turn, provides data to the wireless media access control module 445 which, in turn, provides the payload to a wireless physical access control module 447 which will transmit the data via, for example, a wireless RF, a wired connection, or an optical connection for transmission to a sink node.

Associated modules at the sink node will perform inverse functions in order to extract video and audio encoded across the transmission medium. This includes a wireless physical access control module 450, a wireless media access control module 452, and a logical link control module 455. A transport mechanism 460 extracts data from network packets, to be provided to an audio/video de-multiplexer 465. The audio/video de-multiplexer 465, in turn, provides the packets to a link content protection decryption module 470, if the data payload was encrypted. The link content production decryption module 470 decrypts the data and then provides it to the appropriate video or audio rendering pipeline. The video can be de-packetized 480 and then a video decoder 485 used in order to provide video frames that can be rendered 487 on one or more displays coupled to the sink node. Similarly, audio data can be de-packetized 490 and its audio decoded 495 into a signal suitable for rendering on a speaker or other device coupled to the sink node 497.

VI. Example Encoding of Preferences within Information Elements

Figure 5:
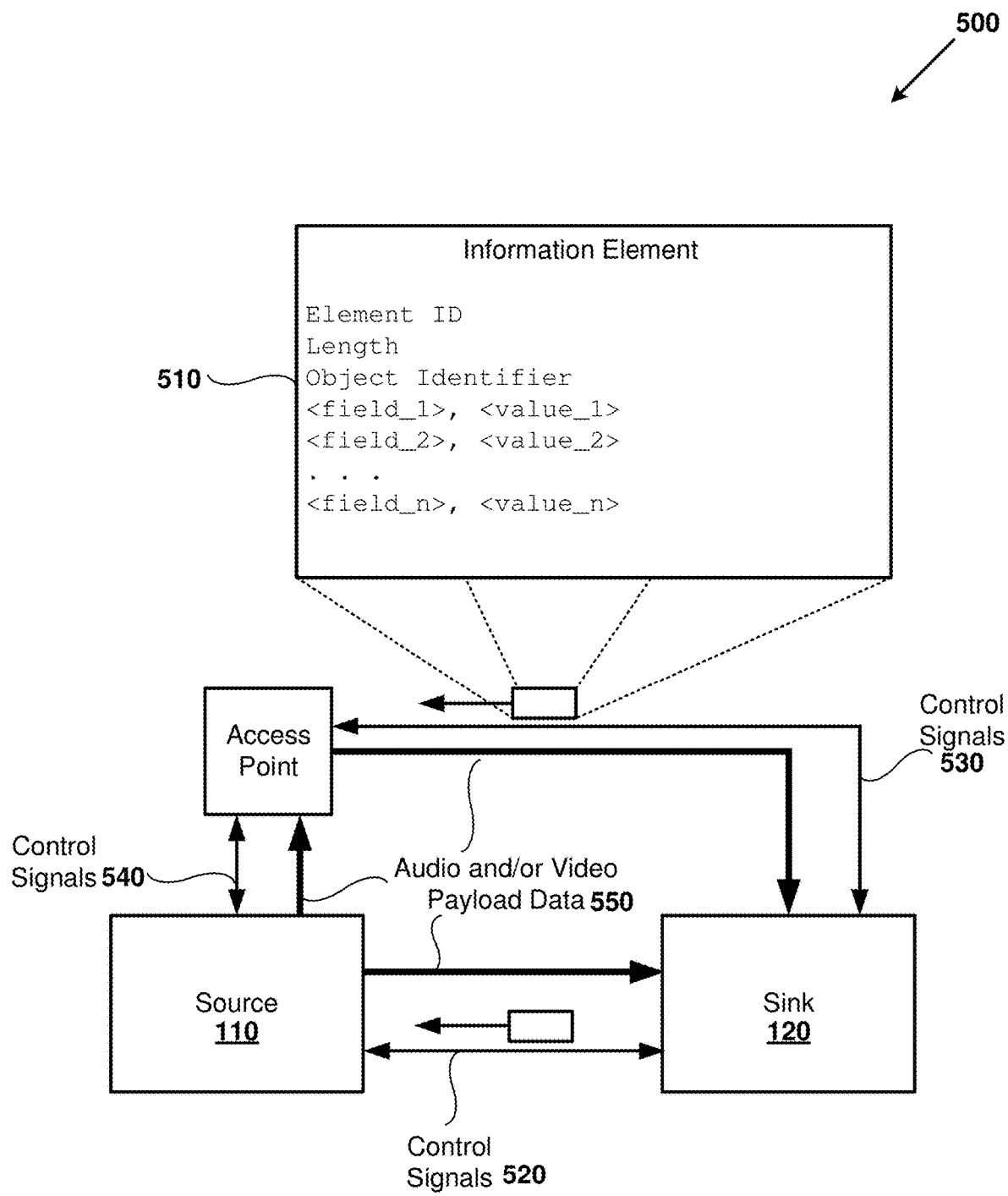
FIG. 5 is an example of encoding preference and other configuration data within an information element, as can be used in certain examples of the disclosed technology.

FIG. 5 is a block diagram 500 that depicts an example of using information elements encoded in direct peer-to-peer communication or infrastructure network communication that can be used to send preference and other data between the source node 110 and the sink node 120. As shown in FIG. 5, an information element 510 can be sent from the sink node 120 to the source node 110 via a direct peer-to-peer connection 520 or via an infrastructure communication path including a connection 530 to the access point and connection 540 from the access point to the source node 110. The information element includes an element identifier, which identifies the packet as an information element. A length field describes the length of data transmitted in the information element. An object identifier identifies a specific source or sink node using a unique identification number. The object identifier can be exchanged as part of the node discovery process. A number of field value pairs, for example field_1, value_1, etc. are used to incorporate data that can be used to configure a communication session. For example, one or more preferences for processing a video stream or an audio stream payload 550 can be indicated by the sink node in one or more field value pairs of the information element 510. Examples of suitable preferences that can be indicated include, but are not limited to, whether to encrypt a connection to the sink node, an identifier of a security protocol to use for communication to the sink node, an indicator of a level of security to use in communications to the sink node, data indicating aspects of a display coupled to the sink node device, for example, resolution, color depth, support of three-dimensional rendering, or other suitable aspects, a manufacturer or model of the sink node device, or location data for the device. The location data can be encoded using a number of suitable formats including, but not limited to, a name of the device, name of a building, floor, and/or room number in which the sink node device display is located, Global Positioning System (GPS) coordinates, Cartesian or radial distances, or other suitable formats. In some examples, the information element 510 is encoded in control signals that are sent via a peer-to-peer communication packet such as a Wi-Fi direct connection packet. In other examples, the information element is encoded within the mDNS data that is sent via an infrastructure network.

VII. Example Method of Controlling Discovery and Pairing

Figure 6:
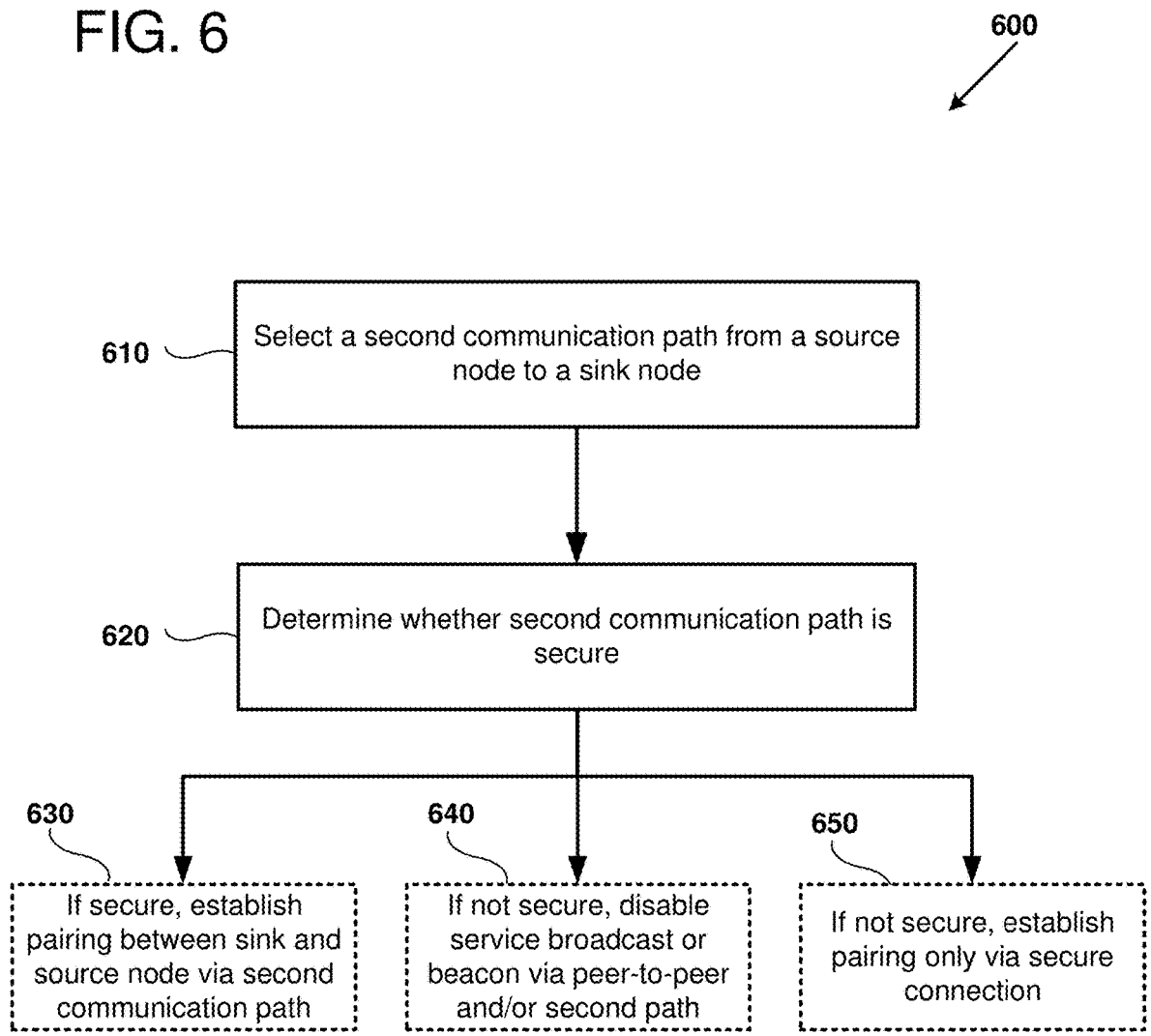
FIG. 6 is a flowchart outlining an example method of determining whether a communication path is secure, as can be used in certain examples of the disclosed technology.

FIG. 6 is a flowchart 600 outlining an example method of securing communications in a computing environment, including computing environments having peer-to-peer source and sink nodes. For example, the computing environments of FIGS. 1-5 can be used to implement the illustrated method. In some examples of the disclosed technology, illustrated operations performed for different variations of the example method can be performed at a sink node, at a source node, or in a computing environment including both sink nodes and source nodes.

At process block 610, a sink node, which is adapted to receive data via a peer-to-peer communication path and one or more different, communication paths, selects a second one of the communication paths from the source node to the sink node.

In some examples, a discovery probe request is received via a peer-to-peer connection, for example, a wireless peer-to-peer connection where a source node has sent the discovery probe request. Responsive to receiving the request, the sink node selects a second, alternate communication path to the source node. It should be noted that discovery options are not limited to WFD connections or mDNS discovery, and that in some examples, other communication technologies, such as discovery using near field communication (NFC), audio, QR codes, or other discovery mechanisms, can supplement or replace WFD discovery and/or mDNS discovery.

In some examples, the sink node advertises services via broadcast messages sent via the peer-to-peer connection. The sink node can identify different communication paths before or after receiving discovery requests from a source node. For example, the sink node can identify wireless access points that are reachable from the sink node and select a second communication path that includes the identified wireless access point. In some examples, the broadcast message may include information that at least partially identifies the second communication path.

In some examples, an identifier is received for a source node in a discovery request received via the peer-to-peer connection. For example, an identifier of a sending source node (name, MAC address, UUID, OID, or other suitable identifier of a source node) can be received at the sink node.

In some examples, the sink node sends an mDNS or WiFi-Direct encoded message as part of the discovery process that includes one or more extended fields based on configuration data stored at the sink node, the fields including an indication of one or more preferences for processing a video stream with the sink node. In some examples, the extended fields include an indication of one or more of the following preferences: whether to encrypt a connection to the sink node, an identifier of a security protocol, an indicator of a level of security, data indicating aspects of a display coupled to a device implementing the sink node, a manufacturer and/or model of a device implementing the sink node, screen resolution of a device implementing the sink node, or a location of a device implementing the sink node.

At process block 620, it is determined whether the second communication path selected at process block 610 is secure. For example, the sink node can probe the network to determine whether wireless access points, routers, switches, gateways, or other components that provide the second communication path between the source nodes and sink nodes can be or is secure. In some examples, one or more of the components can be probed with an API to determine whether the component is configured into a sufficiently secure state. In some examples, the sink node receives a message from another server indicating which of the second communication paths are designated as being secure. After determining whether the second communication path is secure, one or all of the operations discussed below for process blocks 630, 640, and/or 650 can be performed.

At process block 630, if the second communication path is determined to be secure, then a pairing can be established between a sink node and a source node via the second communication path. For example, after completing a discovery message exchange between the source node and the sink node, a communication pairing is established between the node. Once the communication pairing is established, data and control payloads, including video streams, audio streams, control data (e.g., control and data information relating to user interaction with the source node being relayed to the sink node), and other suitable payloads can being transmission between the source and the sink nodes.

At process block 640, if the second communication path is determined to not be secure, then the sink node can disable broadcast of the device identifier, disable broadcast of services provided the sink node device, and/or disable providing such discovery services via a beacon that periodically transmits such service information via a peer-to-peer and/or the second communication path. Thus, unsecured devices and/or unsecured network conditions can be prevented from accessing the sink node, according to configuration preferences stored at or accessible to the sink node.

At process block 650, if the second communication path is determined not to be secured, then pairing can be established via only a communication path that is determined to be secure. For example, if the second communication path is via infrastructure, but is being accessed via an unsecured or insecure wireless access point, pairing may be prevented from occurring via the second communication path. In some examples, if the second communication path is determined not to be secure, then a communication pairing via the second communication path is refused, or specific types of services (e.g., Miracast services) are refused. In such examples, the source node may be allowed to communicate with the sink node via a direct peer-to-peer wireless communication protocol. In other examples, if the peer-to-peer wireless communication path is determined to be insecure, then another connection may be allowed via a wireless or wired infrastructure network.

VIII. Example Method of Determining Security of Communication Paths

Figure 7:
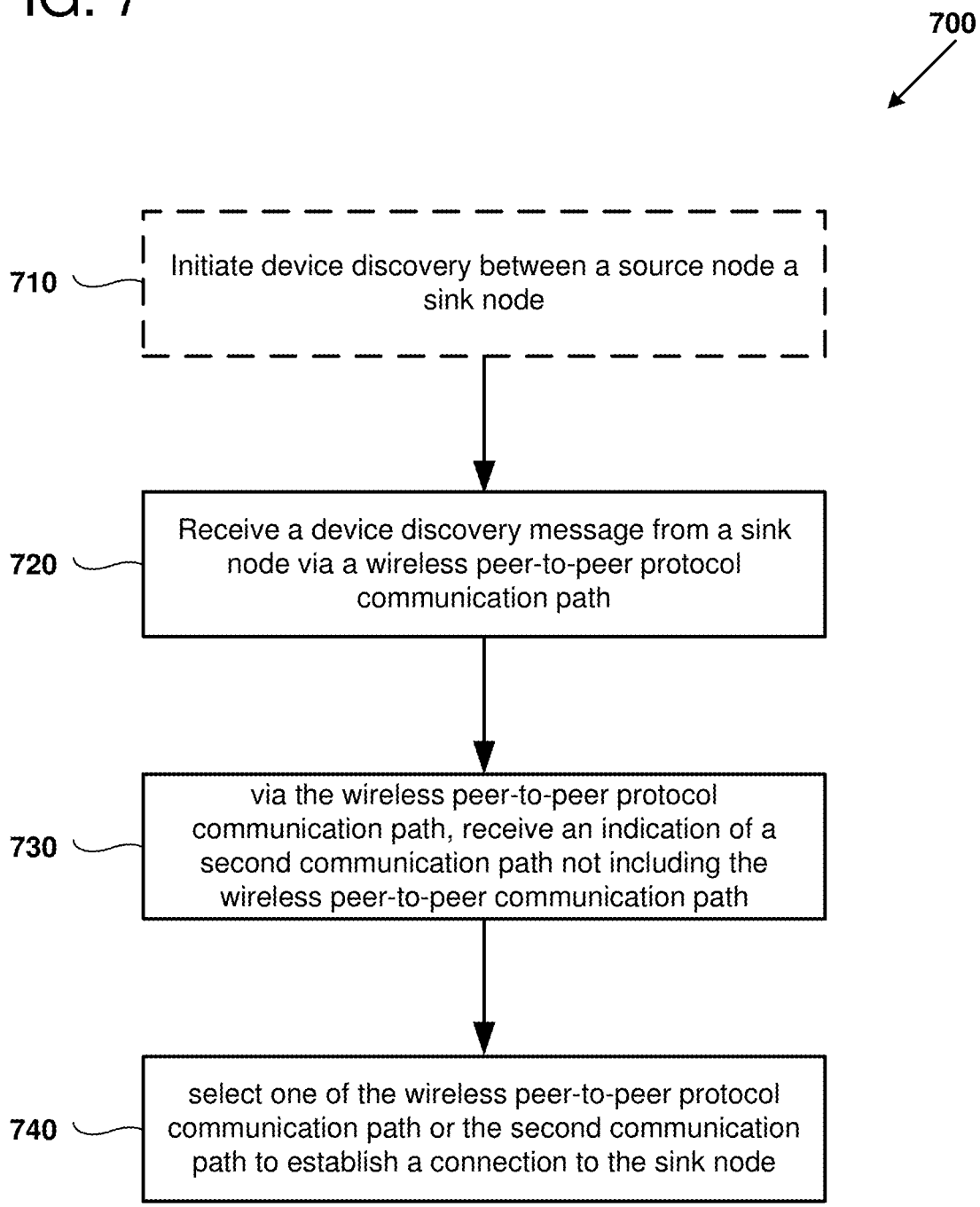
FIG. 7 is a flowchart outlining an example of selecting a communication path, as can be used in certain examples of the disclosed technology.

FIG. 7 is a flowchart 700 outlining an example method of initiating discovery and determining security aspects of two or more communication paths between a source node and a sink node, as can be implemented in certain examples of the disclosed technology. For example, the computing environments detailed above regarding FIGS. 1-5 can be used to perform the disclosed method. In some examples of the disclosed technology, illustrated operations performed for different variations of the example method can be performed at a sink node, at a source node, or in a computing environment including both sink nodes and source nodes.

At process block 710, device discovery is initiated between a source node and a sink node via a wireless peer-to-peer protocol communication path. For example, WFD is an example of a suitable wireless peer-to-peer protocol. In some examples, the discovery messages include sink node beacon messages that can be received by a source node. In other examples, the source node initiates discovery by sending a probe message that is received by the sink node, and the sink node responds with corresponding discovery messages. It should be noted that discovery options are not limited to WFD P2P or mDNS connections, and that in some examples, other discovery techniques, such as using near field communication (NFC), audio, QR codes, or other discovery mechanisms, can supplement or replace WFD discovery and/or mDNS discovery. In some examples, the source node is a Miracast source node and the sink node is a Miracast sink node.

At process block 720, a device discovery message is received at a source node from a sink node via the wireless peer-to-peer protocol communication path that was used at process block 710. For example, a name associated with a sink node, or a MAC address, IP address, UUID, OID, or other suitable identifier of the source node can be used to identify the sink node.

At process block 730, an indication of a second communication path between the source node and the sink node using the source node identifier encoded in the device discovery message is received at the source node. The second communication path does not include the wireless peer-to-peer communication path used for discovery and sending the known identifier at process blocks 710 and 720. For example, the source node may have a second communication path that is accessed via a wireless infrastructure connection that can be coupled to the sink node via an infrastructure network, including a LAN implemented with Ethernet or other suitable networking technology. In some examples, the second communication path is a wired connection.

In some examples, the indication includes one or more of the following: one or more network addresses (e.g., IP addresses), one or more host names or other host identifiers, one or more service set identifiers (SSIDs), an IP address, a uniform resource locator (URL), a uniform resource indicator (URI), one or more network ports, one or more protocol identifiers, or one or more nonces.

At process block 740, the source node selects the wireless peer-to-peer communication path or the second communication path to establish a connection between the source node and the sink node. The source node can select the path based on preferences configure by the user at the source node. In other examples, the path is selected based on preferences configured at the sink node. In some examples, the selected path may be based on the types of services that will be employed over the connection, on the identity or credentials of the source node, and/or on current network conditions.

In some examples, a determination is made (by the source node or by sink node) whether the second communication path determined at process block 730 is secure, or whether the second communication path can be secured. For example, if the second communication path includes an open wireless access point, or a wireless access point using an encryption protocol that is designated as not being secure, then the second communication path is determined to not be secure. In some examples, the second communication path may not be inherently secure, but can be secured using an application level encryption to encrypt point-to-point communications between the source node and the sink node using a suitable encryption protocol such as TLS.

In some examples, one of the communication paths is selected based, at least in part, on an identity of the user associated with the device. For example, a conference room may be setup with a sink node connected to a display and it may be desirable to route data payloads from users that are employees or other people with privileged levels associated with the infrastructure via the second communication path, while "guest" users are directed to use a direct peer-to-peer communication, so as not to use or transmit traffic over a secured infrastructure network. A system administrator can configure at least some of the preferences and store these preferences as configuration data at the sink node.

In some examples, the selected path is selected based on the traffic expected to be carried via the connection. Thus, in some cases it may be desirable not to use direct peer-to-peer communication for streaming video and other data between the source and the sink node. In some examples, if the selected communication path is determined not to be secure, then an encrypted connection can be established via a direct peer-to-peer wireless connection, or via an infrastructure connection. For example, TLS, VPN, HDCP, or other suitable connection encryption protocols can be used. In some examples, if the second communication path is determined not to be secure, then a communication pairing via the second communication path is refused, or specific types of services (e.g., Miracast services) are refused.

In some examples, if the second communication path is not determined to be secure, then the peer-to-peer connection is selected and a communication pairing can be established via a peer-to-peer connection directly between the source node and the sink node. In this case, the source node will bypass transmission of data payloads via the second communication path.

Once the communication pairing has been established, the source node can proceed to send data payloads to the sink node. For example, the source node can send video data, audio data, user interface back channel (UIBC), or other suitable data payloads to a Miracast sink node.

IX. Example Computing System

Figure 8:
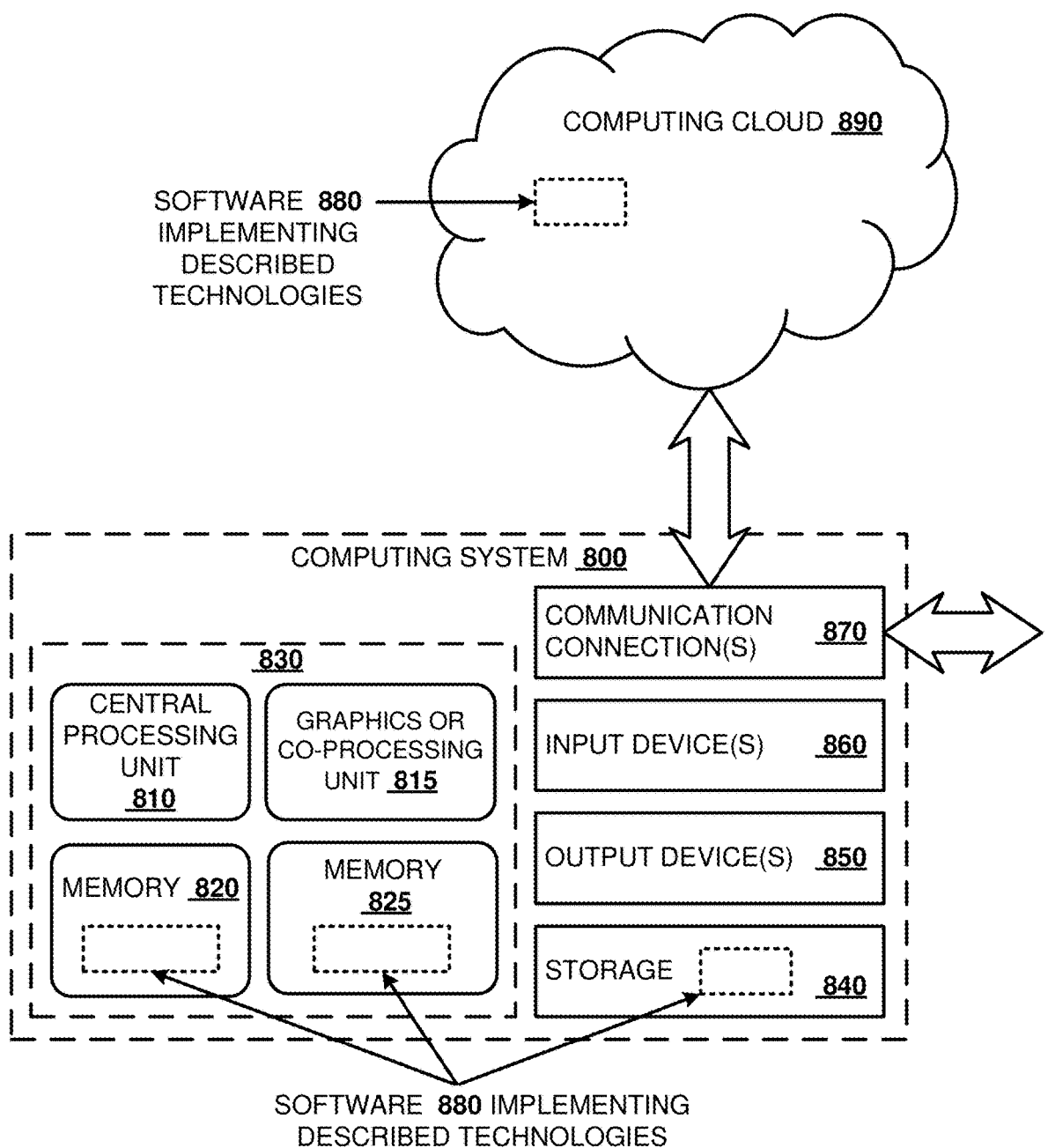
FIG. 8 is a block diagram illustrating a suitable computing environment for implementing certain embodiments of the disclosed technology.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems. For example, the computing system 800 can be used to implement hardware and software for source nodes and sink nodes disclosed herein.

With reference to FIG. 8, the computing system 800 includes one or more processing units 810, 815, non-volatile memory 820, and memory 825. In FIG. 8, this basic configuration 830 is included within a dashed line. The processing units 810, 815 execute computer-executable instructions, including instructions for implementing direct memory access (DMA) with filtering disclosed herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit (GPU) or co-processing unit 815. The tangible memory 825 may be volatile memory (e.g., registers, cache, RAM), non-volatile memory (e.g., ROM, EEPROM, flash memory, etc.), or some combination of the two, accessible by the processing unit(s). The memory 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM, CD-RW, DVD, or Blu-Ray that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

X. Example Computing Environment

FIG. 8 depicts a generalized example of a suitable computing system 800 in which embodiments, techniques, and technologies can be implemented. The computing system 800 is not intended to suggest any limitation as to scope of use or functionality, as the innovations may be implemented in diverse general-purpose or special-purpose computing systems. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions) may be located in both local and remote memory storage devices. By way of further example, the computing system 800 can be used to implement disclosed application hub systems and to provide interactive controls disclosed herein.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. In general, a computing system or computing device can be local or distributed, and can include any combination of special-purpose hardware and/or general-purpose hardware with software implementing the functionality described herein.

Some embodiments of the disclosed methods can be performed using computer-executable instructions implementing all or a portion of the disclosed technology in a computing cloud 890. For example, disclosed servers are located in the computing environment, or the disclosed compilers can be executed on servers located in the computing cloud 890. In some examples, the disclosed compilers execute on traditional central processing units (e.g., RISC or CISC processors).

Computer-readable media are any available media that can be accessed within a computing system 800 environment. By way of example, and not limitation, with the computing system 800 environment, computer-readable media include memory 820 and/or storage 840. As should be readily understood, the term computer-readable storage media includes the media for data storage such as memory 820 and storage 840, and not transmission media such as modulated data signals.

XI. Example Mobile Device

Figure 9:
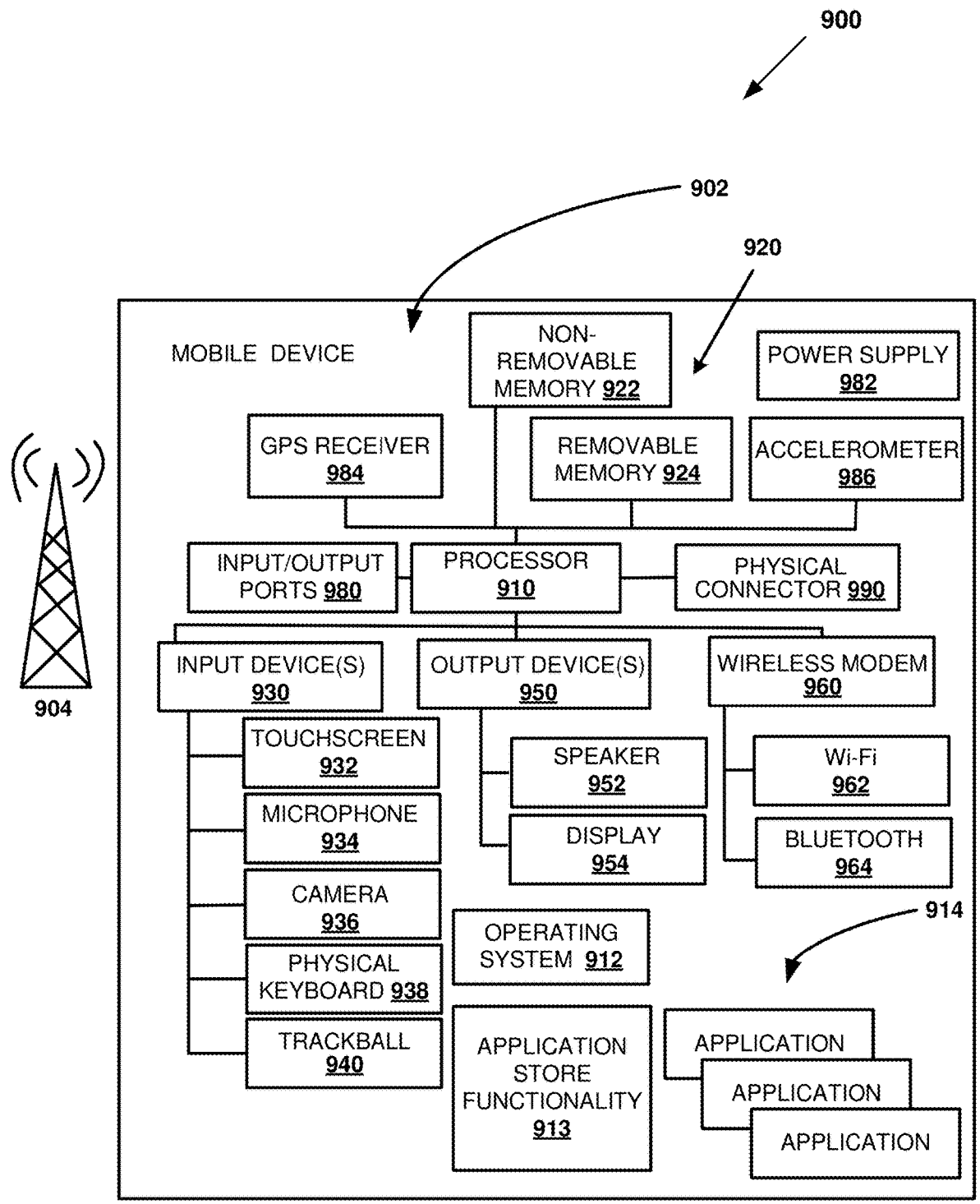
FIG. 9 is a block diagram illustrating an example mobile device that can be used in conjunction with certain embodiments of the disclosed technology.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network. In many examples of the disclosed technology, the mobile device 900 can be used to implement one or more source nodes (e.g., source node 110). In some examples, the mobile device 900 can be used to implement a sink node (e.g., sink node 120).

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

XII. Cloud-Supported Environment

Figure 10:
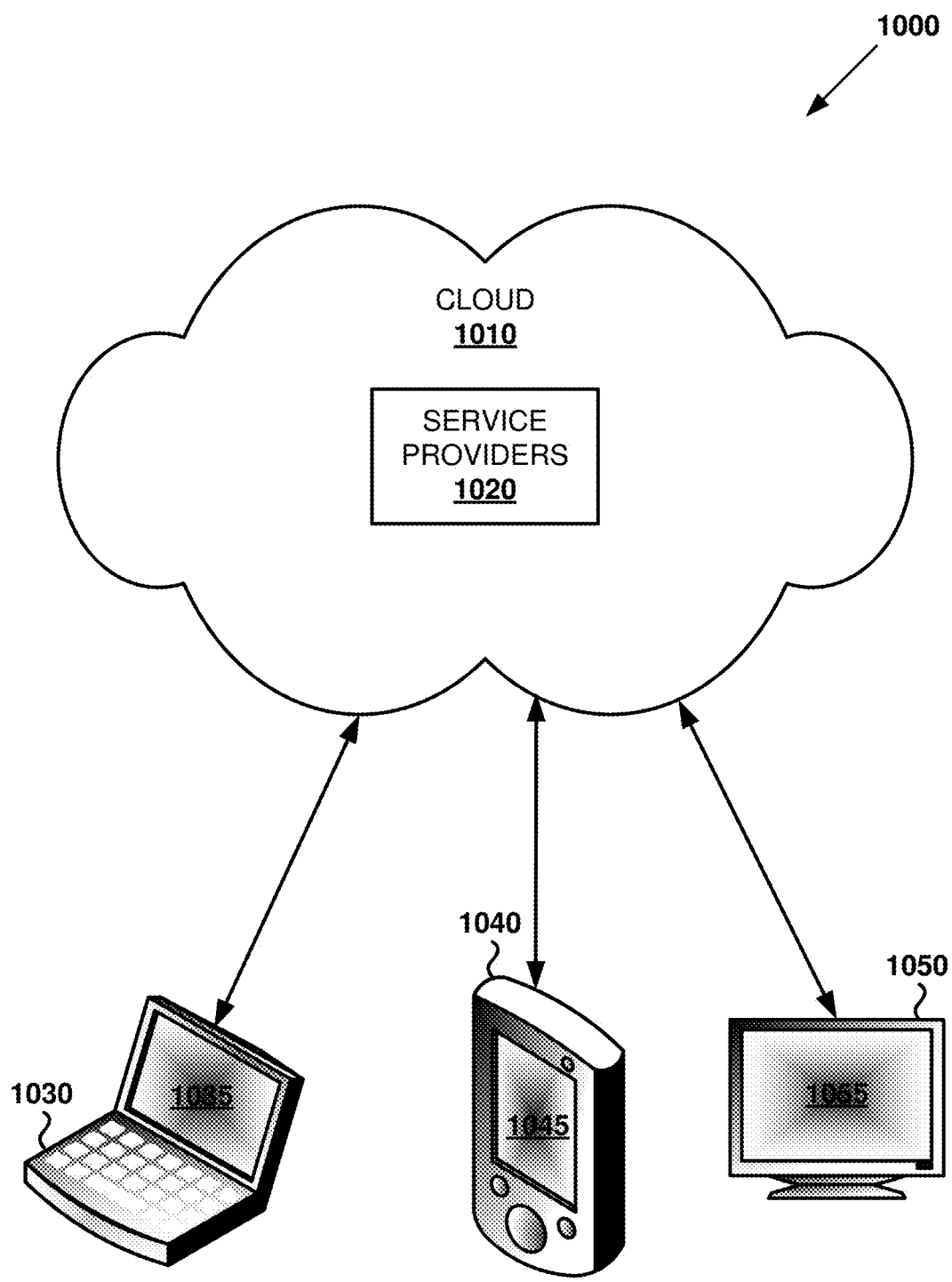
FIG. 10 is block diagram illustrating an example cloud-support environment that can be used in conjunction with certain embodiments of the disclosed technology.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, or 1050) while other tasks (e.g., storage of data to be used in subsequent processing) can be performed in the cloud 1010. The connected devices 1030, 1040, and 1050 can be used to implement sink and/or source nodes.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

XIII. Additional Examples of the Disclosed Technology

Additional examples of the disclosed subject matter are discussed herein in accordance with the examples discussed above.

In some examples of the disclosed technology, a method includes, with a sink node adapted to receive data via a peer-to-peer communication and a different, second communication path to a source node: selecting at least a portion of the second communication path to the sink node, determining whether the second communication path is secure, and, if the second communication path is determined to be secure, then accepting connections via the second communication path. In some examples, the sink node is a Miracast receiver. In some examples, the second communication path is a wired connection path (e.g., an Ethernet or fiber optic cable). In some examples, the second communication path is a wireless connection path (e.g., an ad-hoc or infrastructure Wi-Fi connection according to 802.11a, 802.11b, 802.11g, 802.11n, 802.11ac, GSM, CDMA, TDMA, or other suitable wireless communication path). In some examples, at least a portion of the second communication path is part of an enterprise infrastructure environment.

In some examples, if the second communication path is determined to be secure, then a communication pairing is established between the source node and the sink node via the second communication path. In some examples, if the second communication path is determined not to be secure, then an encrypted connection is established via the second communication path. In some examples, if the second communication path is determined not to be secure, then disabling broadcast notifications of one or more services provided by the sink node via the second communication path.

In some examples, disabling the second communication path includes disabling a wireless discovery beacon. In some examples, disabling the second communication path includes disabling sending of service notification via mDNS-encoded wireless signals. In some examples, disabling the second communication path includes not accepting discovery requests and/or not accepting connections from some or all source nodes.

In some examples, the sink node sends encoded data including one or more extended fields. For example, the sink node can encoded extended fields with data based on configuration data stored at the sink node indicating one or more preferences for communication with the sink node. For example, the extended fields including an indication of one or more preferences for processing a video stream, an audio stream, and/or user interface data with the sink node. The extended fields can include an indication of one or more of the following preferences: whether to encrypt a connection to the sink node, an identifier of a security protocol, an indicator of a level of security, data indicating aspects of a display coupled to a device implementing the sink node, a manufacturer and/or model of a device implementing the sink node, screen resolution of a device implementing the sink node, or a location of a device implementing the sink node. In some examples, the encoded data is encoded in an information element of a WiFi-Direct connection packet. In some examples, the encoded data is sent encoded in an mDNS connection packet via an infrastructure network.

In some examples of the disclosed technology, a method performed with a source node includes receiving a device discovery message from a sink node via a wireless peer-to-peer protocol communication path. The source node further receives, via the wireless peer-to-peer protocol communication path, an indication of a second communication path between the source node and the sink node, the second communication path not including the wireless peer-to-peer communication path, and selects one of the wireless peer-to-peer protocol communication path or the second communication path to establish a connection to the sink node. In some examples, the indication includes two or more second communication paths. In some examples, the source node receives the indication from another path than the wireless peer-to-peer protocol communication path, including an audio signal, an optical wireless signal, a bar code, a QR code, a wireless access point, or another suitable communication path.

In some examples, the second communication path includes a wireless infrastructure connection from the source node to a wireless access point. The wireless access point communications data between the wireless access point via a wired or a wireless connection.

In some examples, receiving the device discovery message includes receiving a beacon message from the sink node. In some examples, the receiving the device discovery message includes receiving a response to a discovery probe request that was sent by the source node to initiate discovery.

In some examples, the indication of the second communication path includes one or more of the following: a network address, a hostname, a service set identifier (SSID), an Internet Protocol (IP) address, a uniform resource locater (URL), a uniform resource indicator (URI), a port, or a nonce. The nonce can be a one-time use, or in other examples, the nonce is reused for two or more connection sessions.

In some examples, the source node sends a discovery probe request to the sink node, and receives the discovery probe response from the sink node sent responsive to the sending the discovery probe request. In some examples, the source node sends the discovery probe request responsive to receiving a beacon message from the sink node.

In some examples of the disclosed technology, the source node determines whether the second communication path is secure or can be secured, and, if the second communication path is determined not to be secure, then the source node establishes a communication pairing between the source node and the sink node via the wireless peer-to-peer protocol communication path.

In some examples, the source node determines whether the second communication path is secure or can be secured and, if the second communication path can be secured, then establishing a communication pairing between the source node and the sink node via encrypted communication over the second communication path. In some examples of the disclosed technology, the source node performs at least one of the security determinations. In some examples, the source node receives a message from a sink node indicating a security determination, and the source node performs operations according to the indicated security determination. In some examples, the source node or the sink node only performs one of determining that a communication path is secure or that a communication path can be secured. In some examples, the determination is made for two or more communication paths.

In some examples of the disclosed methods, the source node is a Miracast source node and the sink node is a Miracast sink node, the wireless peer-to-peer protocol communication path includes a WiFi Direct P2P connection, and the second communication path does not include the wireless peer-to-peer protocol communication path. In some examples, the methods further include sending an identifier of the Miracast source node to the Miracast sink node via the WiFi Direct P2P connection, selecting the second communication path to establish the connection to the sink node, establishing a pairing connection between the source node and the sink node via the second communication path, and sending streaming video (e.g., encoded according to the MPEG-2, H.264, VC-1 coding standards) from the source node to the sink node via the second communication path. In some examples, the method further includes sending streaming audio or user interface data.

In some examples of the disclosed technology, a source node includes a wireless network interface (e.g., a WiFi direct or an 802.11a/b/g/n/ac adapter), a video encoder configured to transmit encoded video via the wireless network interface, source node memory (e.g., storage devices including volatile and/or non-volatile memory), and a processor configured to execute computer-executable instructions stored in the memory that when executed cause the source node to perform a method of transmitting video. The source code can include instructions for performing any of the source node methods disclosed herein. In particular, the source node instructions can include one or more of the following sets of instructions: instructions to send messages encoded in a peer-to-peer protocol with the wireless network interface to a sink node, instructions to select a second, different communication path to the sink node than via the peer-to-peer protocol, instructions to establish a connection between the source node and the sink node via the peer-to-peer protocol or via the second communication path, or instructions to evaluate configuration data stored in the sink node memory and, based on the configuration data, send a message to the source node indicating the determined connection. In some examples, the video encoder is implemented with an ASIC, an FPGA, a system-on-chip (SoC), or a processor that executes instructions stored in memory to implement the video encoder.

In some examples of the disclosed technology, a sink node includes a wireless network interface configured to receive data from the source node wireless network interface encoded according to the peer-to-peer protocol, a display interface (e.g., a digital video interface such as HDMI or DisplayPort, or an analog video interface, such as component, S-video, or composite video interface) other suitable interface, a video decoder configured to decode video received from the source node and transmit the decoded video to the sink node display interface, sink node memory (e.g., storage devices including volatile and/or non-volatile memory), and a processor configured to execute computer-executable sink node instructions stored in the memory that when executed cause the sink node to perform any of the disclosed methods for sink node operations. For example, the processor can be configured to execute computer-executable instructions stored in the memory that when executed cause the source node to perform a method of displaying video received via a computer interface. In particular, the sink node instructions can include instructions to determine a connection for receiving data from the source node, to evaluate configuration data stored in the sink node memory and, based on the configuration data, send a message to the source node indicating the determined connection. In some examples, a wireless access point is coupled to the sink node via a wired network connection and peer-to-peer protocol communication is sent directly to a sink node wireless network interface. In some examples, a display coupled to the sink node display interface. In some examples, one or more of a wireless network interface, a video decoder, configuration data, or other operations are performed by a processor within the display unit.

In some examples, a system includes any one or more of the disclosed source nodes coupled to any one or more of the disclosed sink nodes.

In some examples of the disclosed technology, one or more computer-readable storage media store computer-readable instructions that when executed by a processor, cause the processor to perform any of the methods disclosed herein. Further, such computer-readable storage media can be used to at least partially control the operation of the exemplary apparatus disclosed herein. Exemplary computer-readable storage media can store instructions for performing certain disclosed methods at a source node or at a sink node.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims and their equivalents.

We claim:

1. A method comprising:
   with a sink node adapted to receive data via a peer-to-peer communication path and a different, second communication path to a source node, the second communication path not including the wireless peer-to-peer protocol communication path:
      selecting at least a portion of the second communication path to the sink node;
      determining whether the second communication path is secure; and
      if the second communication path is determined to be secure, then accepting connections via the second communication path.

2. The method of claim 1, further comprising:
   if the second communication path is determined to be secure, then establishing a communication pairing between the source node and the sink node via the second communication path.

3. The method of claim 1, further comprising:
   if the second communication path is determined not to be secure, then establishing an encrypted connection via the second communication path.

4. The method of claim 1, further comprising:
   if the second communication path is determined not to be secure, then disabling broadcast notifications of one or more services provided by the sink node via the second communication path.

5. The method of claim 4, wherein the disabling comprises disabling a wireless discovery beacon or disabling sending of service notification via mDNS-encoded wireless signals.

6. The method of claim 1, further comprising:
   with the sink node, sending encoded data including one or more extended fields based on configuration data stored at the sink node, the fields including an indication of one or more preferences for processing a video stream with the sink node.

7. The method of claim 6, wherein the extended fields include an indication of one or more of the following preferences: whether to encrypt a connection to the sink node, an identifier of a security protocol, an indicator of a level of security, data indicating aspects of a display coupled to a device implementing the sink node, a manufacturer and/or model of a device implementing the sink node, screen resolution of a device implementing the sink node, or a location of a device implementing the sink node.

8. The method of claim 6, wherein the encoded data is encoded in an information element of a WiFi-Direct connection packet.

9. The method of claim 6, wherein the encoded data is sent encoded in an mDNS connection packet via an infrastructure network.

10. A method comprising:
    with a source node, receiving a device discovery message from a sink node via a wireless peer-to-peer protocol communication path;
    via the wireless peer-to-peer protocol communication path, receiving an indication of a second communication path between the source node and the sink node, the second communication path not including the wireless peer-to-peer communication path; and selecting one of the wireless peer-to-peer protocol communication path or the second communication path to establish a connection to the sink node.

11. The method of claim 10, wherein the second communication path comprises a wireless infrastructure connection from the source node to a wireless access point.

12. The method of claim 10, wherein the receiving the device discovery message comprises receiving a beacon message from the sink node.

13. The method of claim 10, wherein the indication includes one or more of the following:
- a network address;
- a hostname;
- a service set identifier (SSID);
- an Internet Protocol (IP) address;
- a uniform resource locater (URL);
- a uniform resource indicator (URI);
- a port; or
- a nonce.

14. The method of claim 10, further comprising:
with the source node, sending a discovery probe request to the sink node, wherein the device discovery message is received responsive to the sending the discovery probe request.

15. The method of claim 10, further comprising:
determining whether the second communication path is secure or can be secured; and
if the second communication path is determined not to be secure, then establishing a communication pairing between the source node and the sink node via the wireless peer-to-peer protocol communication path.

16. The method of claim 10, further comprising:
determining whether the second communication path is secure or can be secured; and
if the second communication path can be secured, then establishing a communication pairing between the source node and the sink node via encrypted communication over the second communication path.

17. The method of claim 10, wherein:
the source node is a Miracast source node and the sink node is a Miracast sink node;
the wireless peer-to-peer protocol communication path includes a WiFi Direct P2P connection;
the second communication path does not include the wireless peer-to-peer protocol communication path; and
the method further comprises:
sending an identifier of the Miracast source node to the Miracast sink node via the WiFi Direct P2P connection,
selecting the second communication path to establish the connection to the sink node,
establishing a pairing connection between the source node and the sink node via the second communication path, and
sending streaming video from the source node to the sink node via the second communication path.

18. One or more computer-readable storage devices storing computer-readable instructions that when executed by a computer, cause the computer to perform a method, the computer-readable instructions comprising:
instructions that cause a source node to receive a device discovery message from a sink node via a wireless peer-to-peer protocol communication path;
instructions that cause the source node, via the wireless peer-to-peer protocol communication path, to receive an indication of a second communication path between the source node and the sink node, the second communication path not including the wireless peer-to-peer communication path; and
instructions that cause the source node to select one of the wireless peer-to-peer protocol communication path or the second communication path to establish a connection to the sink node.

19. The computer-readable storage devices of claim 18, wherein the computer-readable instructions further comprise:
instructions that cause the source node to send a discovery probe request to the sink node, wherein the device discovery message is received responsive to sending the discovery probe request.

20. The computer-readable storage devices of claim 18, wherein the computer-readable instructions further comprise:
instructions that cause the source node to determine whether the second communication path is secure or can be secured; and
instructions that cause the source node to, if the second communication path is determined not to be secure, to establish a communication pairing between the source node and the sink node via the wireless peer-to-peer protocol communication path.

* * * * *